US012190898B2

(12) United States Patent
Bergeron et al.

(10) Patent No.: US 12,190,898 B2
(45) Date of Patent: *Jan. 7, 2025

(54) AUDIO MODIFICATION USING INTERCONNECTED ELECTRONIC DEVICES

(71) Applicant: Apple Inc., Cupertino, CA (US)

(72) Inventors: Kathleen A. Bergeron, Los Gatos, CA (US); Edward Siahaan, San Francisco, CA (US); Jeffrey J. Terlizzi, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/458,841

(22) Filed: Aug. 30, 2023

(65) Prior Publication Data

US 2023/0410826 A1 Dec. 21, 2023

Related U.S. Application Data

(63) Continuation of application No. 17/222,717, filed on Apr. 5, 2021, now Pat. No. 11,776,555.

(60) Provisional application No. 63/081,658, filed on Sep. 22, 2020.

(51) Int. Cl.
*G10L 21/0208* (2013.01)

(52) U.S. Cl.
CPC ................................ *G10L 21/0208* (2013.01)

(58) Field of Classification Search
CPC ..... G10L 21/02; G10L 21/0208; H04R 3/005; H04R 3/12; G10K 11/16; G10K 11/17823
See application file for complete search history.

(56) References Cited

U.S. PATENT DOCUMENTS

| | | | |
|---|---|---|---|
| 8,295,502 | B2 | 10/2012 | Marton |
| 9,286,907 | B2 | 3/2016 | Yang et al. |
| 9,437,200 | B2 | 9/2016 | Sorensen et al. |
| 2011/0102540 | A1 | 5/2011 | Goyal et al. |
| 2014/0286497 | A1 | 9/2014 | Thyssen et al. |
| 2015/0085064 | A1 | 3/2015 | Sanaullah et al. |
| 2020/0351603 | A1 | 11/2020 | Hinthorn et al. |
| 2021/0398539 | A1 | 12/2021 | Wexler et al. |

(Continued)

FOREIGN PATENT DOCUMENTS

CN 106653041 B 2/2020

OTHER PUBLICATIONS

PCT International Search Report and Written Opinion for International Application No. PCT/US2021/071460, mailed Jan. 3, 2022 (12 pp.).

*Primary Examiner* — Rasha S Al Aubaidi
(74) *Attorney, Agent, or Firm* — Dorsey & Whitney LLP

(57) ABSTRACT

Systems and methods are provided for reducing unwanted noise in an electronic audio signal, wherein a computing device having a microphone is configured to receive signals from a sensor on an external device such as a camera, second microphone, or movement sensor. The signals from the sensor are used to identify sound information or characteristics of sounds made by a source of noise, and the audio signal of the microphone is modified to reduce unwanted sounds based on that sound information or based on sounds identified a second audio signal obtained by the second microphone, thereby improving teleconference and video conference audio quality and removing distracting noises from transmitted audio output.

20 Claims, 14 Drawing Sheets

(56) References Cited

U.S. PATENT DOCUMENTS

| | | | |
|---|---|---|---|
| 2022/0093115 | A1 | 3/2022 | Bergeron et al. |
| 2022/0257162 | A1 | 8/2022 | Georganti et al. |

AUDIO MODIFICATION USING INTERCONNECTED ELECTRONIC DEVICES

CROSS-REFERENCE TO RELATED APPLICATION(S)

This is a continuation of U.S. patent application Ser. No. 17/222,717, filed 5 Apr. 2021, and entitled "AUDIO MODIFICATION USING INTERCONNECTED ELECTRONIC DEVICES," which claims priority to U.S. Provisional Patent Application No. 63/081,658 filed 22 Sep. 2020, and entitled "AUDIO MODIFICATION USING INTERCONNECTED ELECTRONIC DEVICES," the entire disclosures of which are hereby incorporated by reference.

FIELD

The described embodiments relate generally to audio modification to remove unwanted sounds. More particularly, the present embodiments relate to using multiple interconnected electronic devices to improve unwanted noise reduction.

BACKGROUND

Teleconferences and video conferences are becoming ever more popular mechanisms for communicating. Many portable computer devices, such as laptops, tablet computers, and smartphones today have built-in microphones usable for these purposes. In addition, many portable computer devices have built-in cameras (or can easily have an inexpensive external camera, such as a web cam, added). This allows for very low cost, highly prevalent participation in teleconferences and video conferences.

It is common for background noises to occur during the conference, such as participants typing on the device being used for the conference. For example, a participant may be taking notes about the conference or multi-tasking while talking or while listening to others talk. With the physical proximity of the keyboard on the portable computer device to a microphone that may also be on the portable computer device, the microphone can easily pick up noise from the keystrokes and transmit the noise to the conference, causing distraction and annoyance to other participants.

Although many products and schemes have been devised for noise canceling, including specifically canceling noises produced by keyboard typing in computer teleconferencing, these systems leave often lack precision and accuracy when canceling the noise. Furthermore, audio recordings of many other kinds, such as recordings of musical instruments, can be improved by removing unwanted sounds. There is, therefore, a constant need for improvements to audio modification systems and techniques.

SUMMARY

One aspect of the present disclosure relates to a computing device for managing teleconferencing. The computing device can include a processor and a memory device configured for electrical communication with the processor. The memory device can include instructions encoded thereon that, when executed by the processor, cause the processor to receive an audio signal from a microphone of a source computer, receive a sensor signal from at least one of a camera, a movement sensor, a position sensor, or a second microphone at the source computer, detect, using the sensor signal, a source of a sound in the audio signal of the microphone, modify the audio signal to reduce the sound in the audio signal, and send the modified audio signal to a destination computer.

In some examples, detecting the source can include identifying a computer input device in an image obtained from the camera, and the sound can include a noise produced by a person using the computer input device. The instructions can further cause the processor to detect a position of a user relative to the source computer, wherein the audio signal can be modified based on the position of the user relative to the source computer. Detecting the source can include detecting a movement or change in position of the source computer via the movement sensor or the position sensor. The camera, the movement sensor, the position sensor, or the second microphone can be attached to the source computer. In some examples, the camera, the movement sensor, the position sensor, or the second microphone can be part of a device separate from, and in electrical communication with, the source computer.

Another aspect of the disclosure relates to a method of managing sounds and noise while teleconferencing. The method can include recording an audio signal via a microphone of a source computer, sensing a sound source via a sensor including a camera, a movement sensor, or a second microphone, detecting a wanted sound in the audio signal and an unwanted sound in the audio signal, wherein the wanted sound is created by the sound source detected via the sensor, amplifying the wanted sound in the audio signal relative to the unwanted sound, and transmitting the amplified audio signal to a destination computer.

In some embodiments, detecting the sound source includes detecting a person via the sensor, and wherein the wanted sound includes a vocal sound and the unwanted sound includes a non-vocal sound. The camera, the movement sensor, or the second microphone can be part of a device separate from, and in electrical communication with, the source computer. Detecting the sound source can include identifying a computer input device in an image obtained from the camera, and the unwanted sound can include a noise produced by a person using the computer input device.

In some embodiments, the method can further include detecting a position of a user relative to the source computer via the sensor, wherein the wanted sound is amplified based on the position of the user relative to the source computer. In some embodiments, detecting the sound source includes detecting a movement or change in position of the source computer via the movement sensor.

Another aspect of the disclosure relates to a computing device including an imaging device, a microphone, a processor in electronic communication with the imaging device and with the microphone, and a memory device in electronic communication with the processor. The memory device can include instructions encoded thereon that, when executed by the processor, cause the computing device to obtain an image via the imaging device, identify a source of a target noise in the image, receive an audio signal produced by the microphone, and modify the audio signal to change a representation of the target noise in the audio signal.

Modifying the audio signal can include at least partially canceling the representation of the target noise in the audio signal. Modifying the audio signal can also include isolating the representation of the target noise in the audio signal. In some examples, isolating the representation of the target noise includes beamforming microphones to the source of the target noise. Identifying the source can include identifying an object in the image. The object can include a body part of a person. The target noise can include a human vocal sound, and identifying the source can include detecting a vocalizing action by a person in the image.

Yet another aspect of the disclosure relates to a system for reducing unwanted noise in an electronic audio signal, with the system including a computing device including a processor, a memory device, and a microphone, and an electronic device in electrical communication with and separate from the computing device, the electronic device including a sensor. The memory device can include electronic instructions encoded thereon that, when executed by the processor, cause the computing device to: detect a source of a target noise using the sensor of the electronic device, receive an audio signal produced by the microphone of the computing device, with the audio signal including a representation of the target noise, and modify the audio signal to reduce the representation of the target noise in the audio signal.

In some examples, the computing device includes a keyboard, the target noise is a sound originating from the keyboard, the representation of the target noise is a recording of the target noise, and modifying the audio signal includes at least partially canceling out the recording of the target noise in the audio signal. The sensor can include an imaging device, and detecting the source of the target noise can include detecting an object in an image sensed by the imaging device. The sensor can include a second microphone configured to detect the target noise, and detecting production of the target noise can include receiving an audio signal produced by the second microphone including a second representation of the target noise. The sensor can be configured to detect a position or a movement of the electronic device, and detecting production of the target noise can include detecting a change in position of the electronic device or a movement of the electronic device via the sensor. The electronic device can include a wearable electronic device. The electronic device can include a peripheral input device for the computing device.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
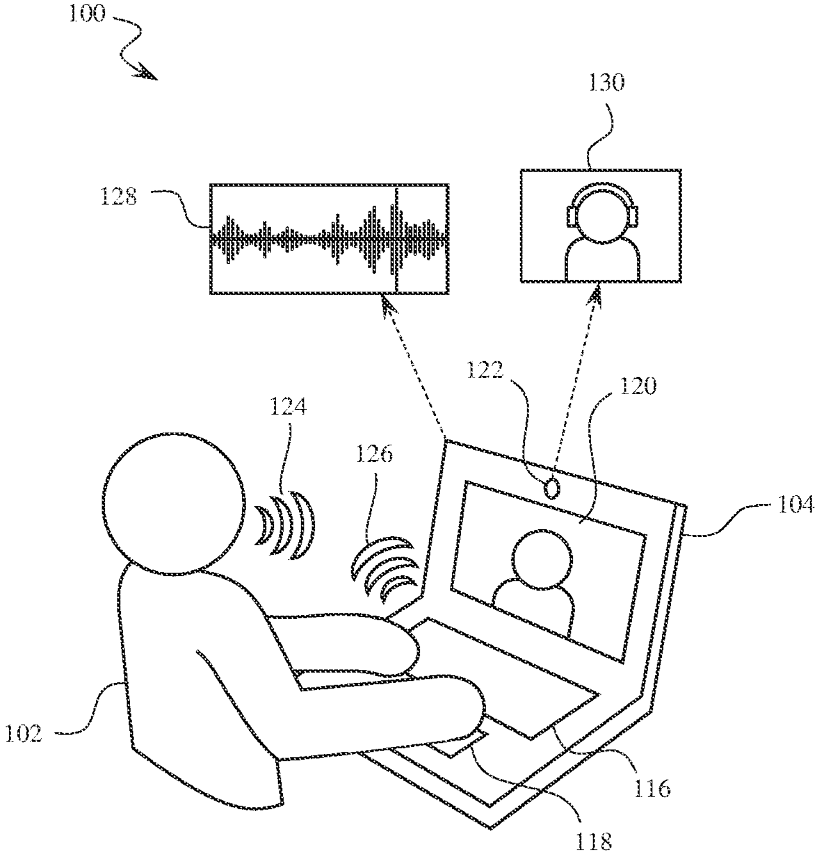
FIG. 1 shows a diagram illustrating an environment of the present disclosure.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments, as defined by the appended claims.

The following disclosure relates to using microphones, cameras, position and movement sensors, and related devices to identify unwanted sounds in an audio signal, or to identify sources of unwanted sounds in an audio signal, image, or position/motion signal, and to modify the audio signal or mute recording devices to reduce the occurrence, volume, or prevalence of unwanted sound in an output audio signal. Thus, by using principles of the present disclosure, unwanted sounds can be removed from audio signals recorded for teleconferencing, video conferencing, musical recordings, voice messages, and related activities.

Although conventional systems and methods have been devised that include actively canceling bands of frequencies in an audio signal, such as in active noise-canceling headphones which at least partially inverse a recorded audio signal and provide the modified signal to the user via a speaker, these systems and methods do not perform well in eliminating unique sounds and noises that fall outside predefined frequency limits. Additionally, although some systems and methods have been proposed that claim to cancel noise related to specific waveforms, such as keyboard typing sounds, detecting the production of the sound is generally reactive or based on getting a direct signal from the source of the sound, such as by detecting that a keyboard is being operated due to switches of the keyboard itself being triggered.

Conventional systems and methods can be improved through principles and aspects of the present disclosure which relate to using a system of devices that coordinate using multiple different sensors and/or multiple different types of sensors on one or more device to better identify, isolate, and reduce sounds in an audio signal. Additionally, aspects of the present disclosure relate to anticipating the appearance of sounds in an audio signal to preemptively remove unwanted noises or to provide information such as warnings to users of the systems described herein.

Some embodiments can include a computing device for managing teleconferencing, such as a server or client device that is configured to receive an audio signal from a microphone of the source computer and to receive a sensor signal from a separate sensor such as a camera, a movement sensor, a position sensor, or second microphone that is either part of, or in the vicinity of, the source computer. The sensor signal can come from electronic devices that are commonly used in the environment of a teleconferencing participant, such as a smart phone, a tablet computer, a smart watch or other wearable smart device, a headset or headphone device, a smart speaker or other recording device, related devices, and combinations thereof. Thus, cameras and other sensors on these nearby devices can be used to help collect signals, images, and other information in the environment of the participant to identify and remove unwanted sounds more effectively and optimally than could be done with a single device. The modified audio signal can then be sent to other devices, such as a destination computer, and the participants at the destination computer can enjoy clearer, less-distracting communication with those at the source computer.

A camera or other image sensor can be used to reduce unwanted noises, object, person, and shape recognition techniques by analyzing images from the camera to determine sources of unwanted sounds by their appearance, by their movement in images or videos, by their distance from the camera, etc. For example, in one embodiment, the camera can be used to observe and determine whether a participant's mouth is moving or not, and an audio signal recorded by the participant's device can be modified (e.g., audio can be muted when the mouth is not moving and unmuted when the mouth is moving). Furthermore, the camera can observe the position and/or orientation of the participant to enable the system to intelligently determine whether the participant intends to provide input to the microphone (e.g., is facing the microphone) or not so that an intentional communication can be reduced or muted entirely.

In another example, the camera can be used to observe the position and condition of an object, such as a computer input device (e.g., a peripheral input device), to determine whether a user is typing, clicking a mouse, adjusting a microphone, etc., and the audio signal can be modified by muting or unmuting a microphone to avoid the sound or by filtering out/canceling out certain waveforms or frequencies corresponding to noise produced by the object present in the camera image. In this case, the system can access a database containing representative recordings of sounds made by the object and can thereby effectively identify and cancel out those sounds when they are recorded by the primary microphone, thereby enabling noise cancellation of specific sounds using a camera to identify which sounds need to be canceled.

In embodiments using multiple microphones, a primary microphone signal can be recorded using a computing device, and a secondary microphone signal can be recorded using a separate device in the environment of the computing device. The separate device, such as a smart phone or wearable device in the same room as the computing device, can obtain the secondary microphone signal with waveforms that are present in the primary microphone signal, but at different amplitudes and, potentially, different frequencies. The differences between the multiple microphone signals can be analyzed by the computing device to identify and remove specific unwanted sounds (or to beamform microphones to isolate wanted sounds coming from a target source (e.g., the user's face)). Isolating wanted sounds coming from a sound source can comprise amplifying those sounds relative to other, unwanted sounds recorded in the environment of the sound source, such as by attenuating frequencies other than those in the wanted sounds, increasing the volume or amplitude of the waveforms or frequencies corresponding to the wanted sounds, similar methods, and combinations thereof.

In embodiments using position or movement sensors, movements or changes in the position of a computing device or a secondary device (e.g., a wearable device) can be used to determine when certain unwanted noises are being made in the user's environment. For example, accelerometers in a smart watch can output signals suggesting that a user is typing on a keyboard or raising his or her elbow to sneeze, and that data can be used to predict and reduce the volume or prevalence of unwanted noises that correspond to that activity detected.

These and other embodiments are discussed below with reference to the figures. However, those skilled in the art will readily appreciate that the detailed description given herein with respect to these figures is for explanatory purposes only and should not be construed as limiting.

FIG. 1 is an illustration of a video conferencing environment 100 showing aspects of the present disclosure. It will be understood that although a video conferencing environment 100 is shown in FIG. 1, principles and aspects of the present disclosure can be applied to many different settings in which audio recordings are being made and/or transmitted, such as in teleconferencing (including telephone calls), studio recording (e.g., musical recordings), live recording, filmmaking, telepresence interacting, robot control, related settings and areas of application, and combinations thereof. The same is true of other embodiments disclosed in connection with the other figures. Furthermore, as used herein, a device (e.g., a sensor) comprising at least one of a first option (e.g., a camera), a second option (e.g., a movement sensor), or a third option (e.g., a second microphone) should be understood as referring to a device that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

As shown in the video conferencing environment 100, a user 102 (i.e., a conference participant) interacts with a computing device 104. The computing device 104 can include a set of computer input devices (e.g., keyboard 116 and touchpad 118), a display 120, and a camera 122 (or other imaging device).

As the user 102 interacts with the computing device 104, the user 102 can vocalize or make other vocalizing actions or noise-making sounds with his or her body, symbolically represented as sound 124, and can make sounds while interacting with items in the environment 100, such as the keyboard 116 and touchpad 118, symbolically represented as sound 126. A microphone used by the user 102, such as a microphone of the computing device 104 (see FIG. 2), can record the sounds 124, 126 and can produce an audio signal, schematically represented by waveform 128. The signal can send the recorded waveform 128 to another device, such as another computing device (i.e., a destination computing device) where another user can listen to the sound represented by the waveform 128 at another location via a loudspeaker (e.g., a loudspeaker on the other computing device). Thus, the user 102 can send an audible message to one or more other users via the computing device 104, such as in a teleconference. Other sounds, such as non-vocal sounds (e.g., noises made by other body parts of the speaker, other devices in the vicinity of the speaker, etc.) can also be recorded in the teleconference. These other sounds, such as non-vocal sounds that are unwanted in the teleconference, can be detected and removed, or made less prominent relative to the vocal sounds in the recording.

Additionally, the camera 122 of the computing device 104 can obtain an image 130 or a series of images (e.g., a still image or video recording) of the user 102, other people, animals, devices (e.g., 106, 108, 110, 112, 116, 118), and other objects (e.g., inanimate objects or animate objects that are not in electrical communication with the computing device 104) in the environment 100. While videoconferencing, the camera 122 can therefore obtain an image 130 or video feed that is transferred to other users.

Figure 2:
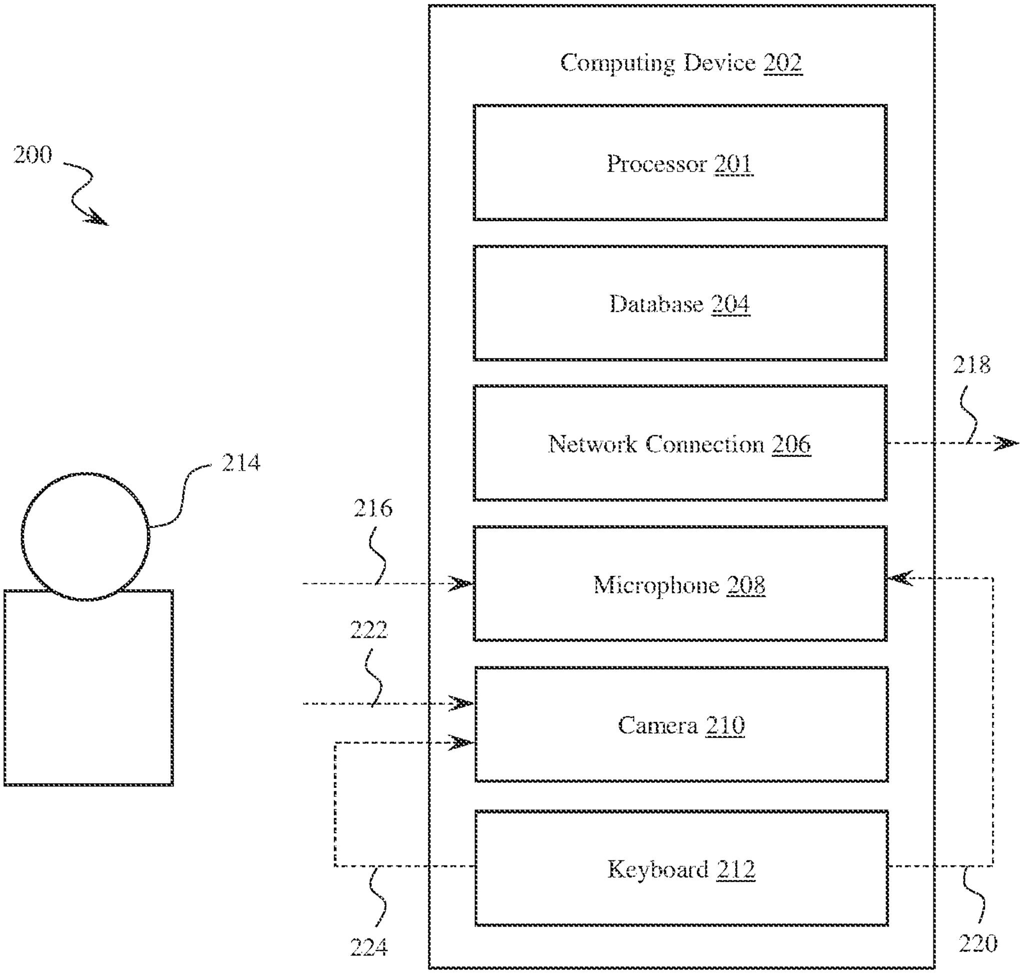
FIG. 2 shows a schematic view of a computing system of the present disclosure.

FIG. 2 illustrates a schematic representation of a system 200 for reducing unwanted noise in an electronic audio signal. The system 200 can include a computing device 202, such as, for example, the computing device 104 of FIG. 1 or the computing system 1800 of FIG. 18. The computing device 202 can be referred to as a source device or source computer, and devices to which audio signals are sent by the computing device 202 can be referred to as destination devices or destination computers. The computing device 202 can include computing components such as those described in connection with FIG. 18 below (e.g., a processor 201 or 1802). Thus, only a limited number of components of the computing device 202 are shown in the block diagram of FIG. 2. The computing device 202 can include a database 204 (e.g., on a memory device), a network connection 206, a microphone 208, a camera 210 (e.g., camera 122), and a keyboard 212 (e.g., keyboard 116).

The microphone 208 can transduce sound waves from the environment in which a user 214 is located near the computing device 202, as indicated by arrow 216. Thus, the user can vocalize or otherwise make noise near the computing device 202 to record a waveform using the microphone 208. The recorded waveform can be converted and sent to other computing devices via the network connection 206, as indicated by arrow 218.

Sometimes, sounds made by the user 214 or sounds in the environment of the user 214 are unwanted or undesirable to send to other computing devices. For example, the user 214 can operate the keyboard 212 while the microphone 208 is actively recording the sound in the environment, as indicated by arrow 220, and the noise made by the keyboard 212 can be distracting or otherwise obtrusive to listeners at the other computing devices. In these situations, the computing device 202 can be configured to identify the unwanted noises (e.g., the sounds recorded as represented by arrow 220) in the recorded waveform using the camera 210.

The camera 210 can be positioned and oriented on or near the computing device 202 in a manner configured to observe and record images (as represented by arrow 222) of typical sound-producing objects, people, and animals in the surroundings of the computing device 202. The camera 210 can therefore, in some embodiments, face toward the user's face or hands, toward the keyboard 212, toward another computer input device or external device, or toward another typical source of unwanted sounds. As represented by arrow 224, the camera 210 can receive images of the keyboard 212 in this example system 200.

Figure 3:
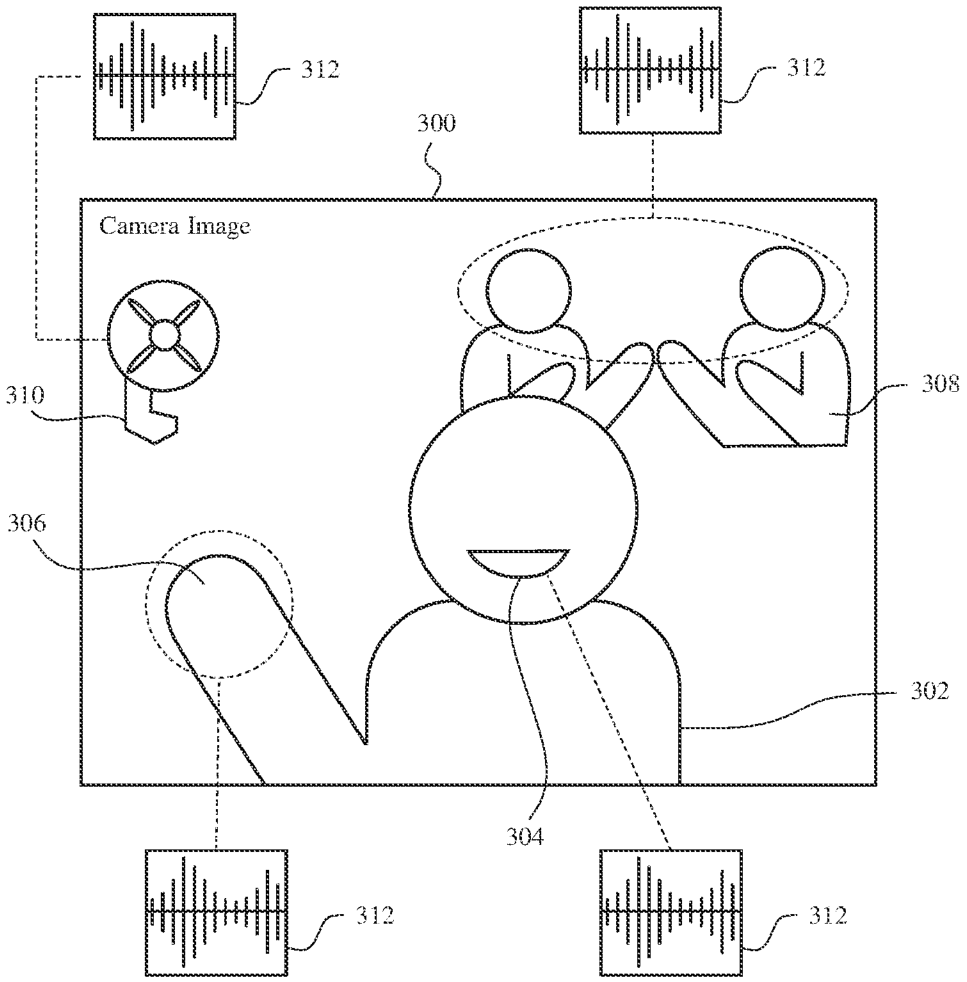
FIG. 3 shows a diagram representing a camera image of an embodiment of the present disclosure.

FIG. 3 shows an example image 300 captured by a camera of the present disclosure (e.g., camera 122 or 210). The image 300 can have a border, frame, or other outer limit within which the camera is capable of discerning light that enters a sensor in the camera, as represented by the generally rectangular shape of image 300. In other embodiments, the image 300 can include alternate aspect ratios and shapes (e.g., rounded rectangular, square, wide angle/fisheye, elliptical, or circular).

The image 300 can include representations of people and objects within the view of the camera, such as an image of the user 302 or an image of a body part or appendage of the user (e.g., an image of her mouth 304 or an image of her hand 306). The image 300 can also include representations of other people (e.g., conversing couple 308) and objects (e.g., fan 310) within the field of view of the camera. Accordingly, information from the camera in the image 300 can be provided to a processor of the computing device 202 for analysis.

Figure 4:
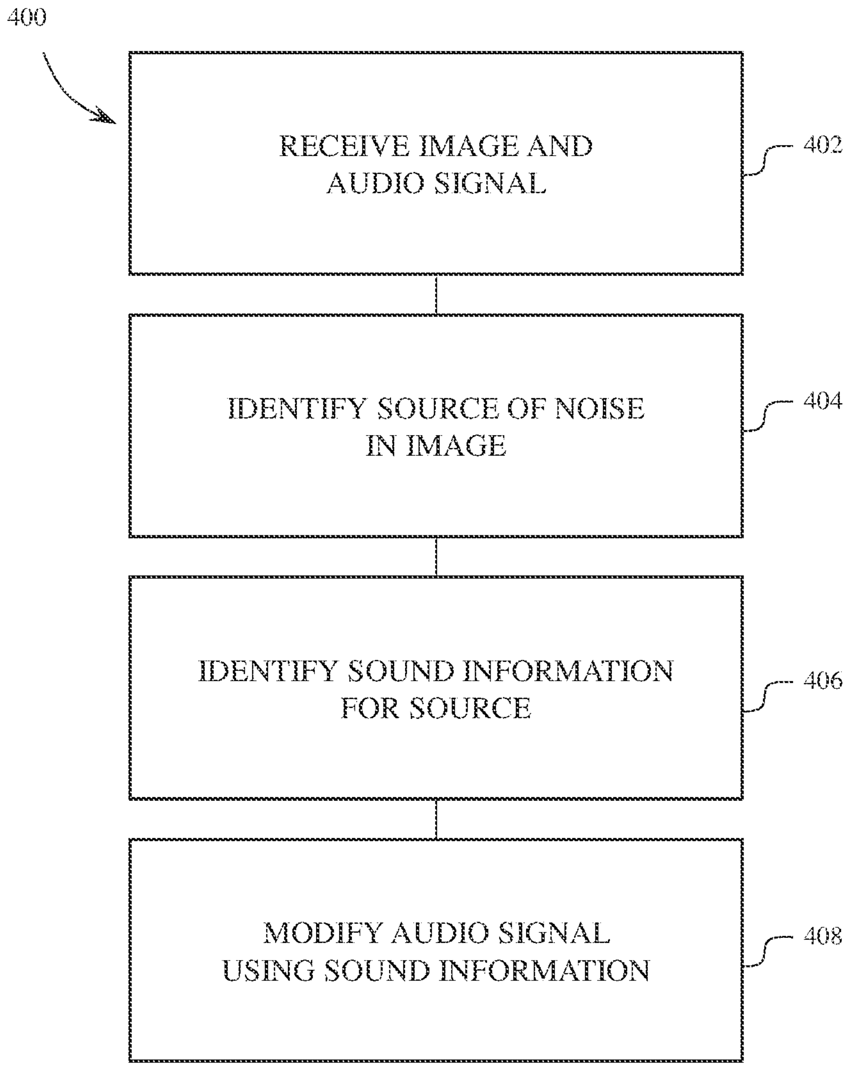
FIG. 4 shows a flow diagram of a method of the present disclosure.

FIG. 4 is a flow diagram showing a method 400 of processing and analyzing images and audio signals in order to reduce unwanted noise in an audio recording. In this method 400, a computing device can receive an image and audio signal, as indicated in block 402. For example, the computing device can receive an image (e.g., 300) from a camera (e.g., 122 and 210) and can receive an audio signal from a microphone (e.g., 208). The camera or microphone can be part of the computing device operating method 400 or can be transmitted to the computing device from a separate computing device or other electronic device having the camera or microphone.

As indicated in block 404, the computing device can identify source of a noise in the image. For instance, as shown in FIG. 3, the image 300 can include shapes, colors, tones, etc. that are recorded representations of people and things in the field of view of the camera. Thus, while performing block 404, the computing device can analyze the information in the image 300 and correlate the information in the image with people and things that are sources of noises. For example, the computing device can use object recognition techniques known in the art (e.g., edge detection, shape detection, etc.) to identify what certain shapes and other image information in the image 300 represent. A face recognition algorithm can be used to identify a user 214 from the image of the user 302 or other people from the representation of the conversing couple 308, and a shape recognition algorithm can be used to identify a mouth or hand from the image representations of the mouth 304 and hand 306 or to identify a fan from the image representation of a fan 310. Additionally, performance of block 404 can include analyzing a video or series of images to determine that people or things in the video or series of images are generating sound based on their movements, such as by determining via the computing device that a mouth of a person is moving in a manner correlated to a vocalizing movement, that the fan is on and spinning, that the hand of the user is touching a keyboard in a typing manner, etc.

The method 400 can further include identifying sound information (e.g., a waveform or sound pattern) correlated with the source of the noise identified, as indicated in block 406. Identifying the sound information can include accessing a database (e.g., 204 or a network-connected database) that stores recorded sounds or other sound information that is representative of various objects. Thus, identifying the sound information can include identifying one or more recorded sounds in the database that correspond to the object or person identified in connection with block 404. For example, such recorded sound information is shown and discussed in connection with FIG. 6 below. The waveform or sound pattern identified in block 406 can be a recording of the source of block 404 or can be a set of sound properties (e.g., frequency, rhythm, harmonization, modulation, etc.) that generally define noises made by objects similar to the source of block 404. Thus, the waveform or sound pattern does not necessarily have to be an exact representation or recording of the source of block 404 and can be an approximation or similar representation thereof. Additionally, if multiple different sources of noises are detected in the same image, the computing device can determine sound information for each of the sources, such as the different waveforms 312 shown in FIG. 3 that correspond to different noise sources (e.g., 304, 306, 308, 310) in image 300.

The method 400 can further include modifying the audio signal of block 402 using the sound information identified in block 406. For instance, the computing device can analyze the audio signal of block 402 to identify waveforms and sound patterns that indicate the recorded presence of a noise produced by the source identified in block 404 (i.e., a target noise). In some examples, the audio signal can include sound information (e.g., a pattern or frequency) that is similar to or a copy of the target noise within a recorded time span in the audio signal, and the computing device can modify the audio signal within that recorded time span to change the representation of the target noise, as indicated in block 408.

Figure 5:
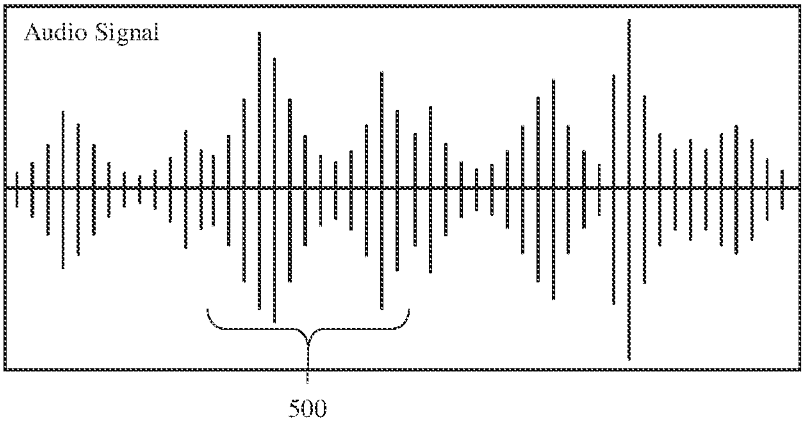
FIG. 5 shows a diagram representing an audio signal obtained by a microphone of the present disclosure.
Figure 6:
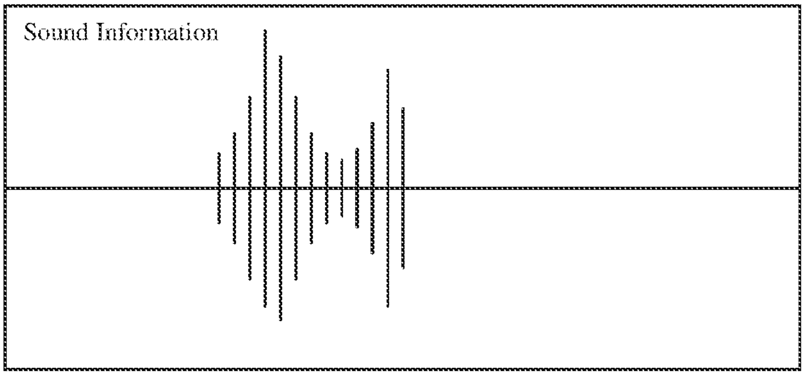
FIG. 6 shows a diagram representing sound information of a source of noise according to an embodiment of the present disclosure.
Figure 7:
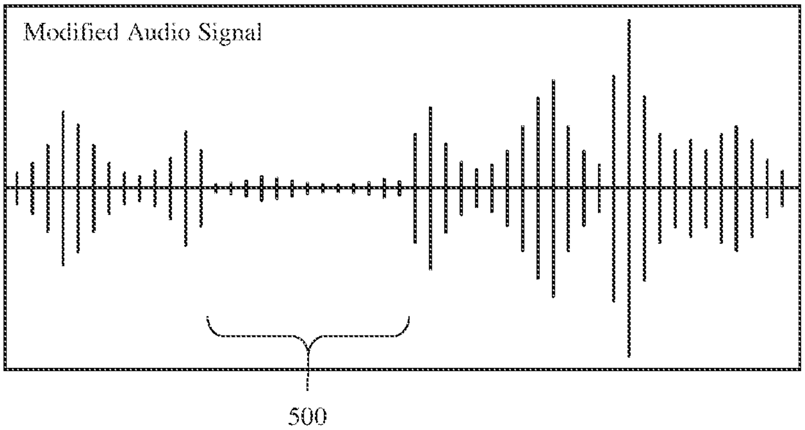
FIG. 7 shows a diagram representing a modified audio signal of the present disclosure.

Modifying the audio signal can include reducing the volume or amplitude of a waveform or set of frequencies in the audio signal to make the target noise less prevalent or noticeable to a listener of the audio signal at a destination computer or at the computing device when the audio signal is played back. For example, as shown in FIG. 5, the audio signal (e.g., waveform 128) can include various frequencies and amplitudes recorded over time. FIG. 6 shows a representation of a waveform or sound pattern that correlates to a noise made by a particular object (as identified and determined in block 406). Thus, in block 408, the computing device can analyze the audio signal of FIG. 5 to detect the presence of a waveform similar to or matching the waveform of FIG. 6. In this example, the waveform of FIG. 6 is identified within time span 500. Accordingly, the computing device can modify the audio signal within time span 500 to attenuate certain frequencies (or all frequencies) to minimize or eliminate the appearance of the target noise in the modified audio signal, as shown in FIG. 7. Similarly, a microphone can be muted when those sounds occur or those sounds can be removed when the recorded audio signal is sent to another device. In this way, the computing device can produce a modified audio signal that is less distracting and contains fewer or quieter unwanted noises, thereby leading to an improved user experience for the presenter in a teleconference or videoconference and for the viewers or listeners as well.

Referring again to FIG. 4, in a related embodiment, the computing device can modify the audio signal in block 408 by applying a filter to the entire audio signal based on the sound information of block 406. Thus, rather than identifying a particular waveform in a particular span of time of the recorded audio signal, the sound information of block 406 can include some properties to generally modify the entire audio signal. For example, if the image contains a noise-making object such as a fan, the frequencies associated with a fan can be attenuated and removed from the entire audio signal, even when the fan is not detected or at times before the fan has been detected by the camera, as opposed to only removing those frequencies when the fan is visible to the camera or as opposed to only removing those frequencies when a particular fan-representative waveform is identified in the audio signal. Comparably, if a keyboard is identified in the camera image, any typing sound patterns or correlated frequencies in the audio signal can be detected and removed, whether or not the keyboard is visible to the camera at the time the typing sounds occur.

Figure 8:
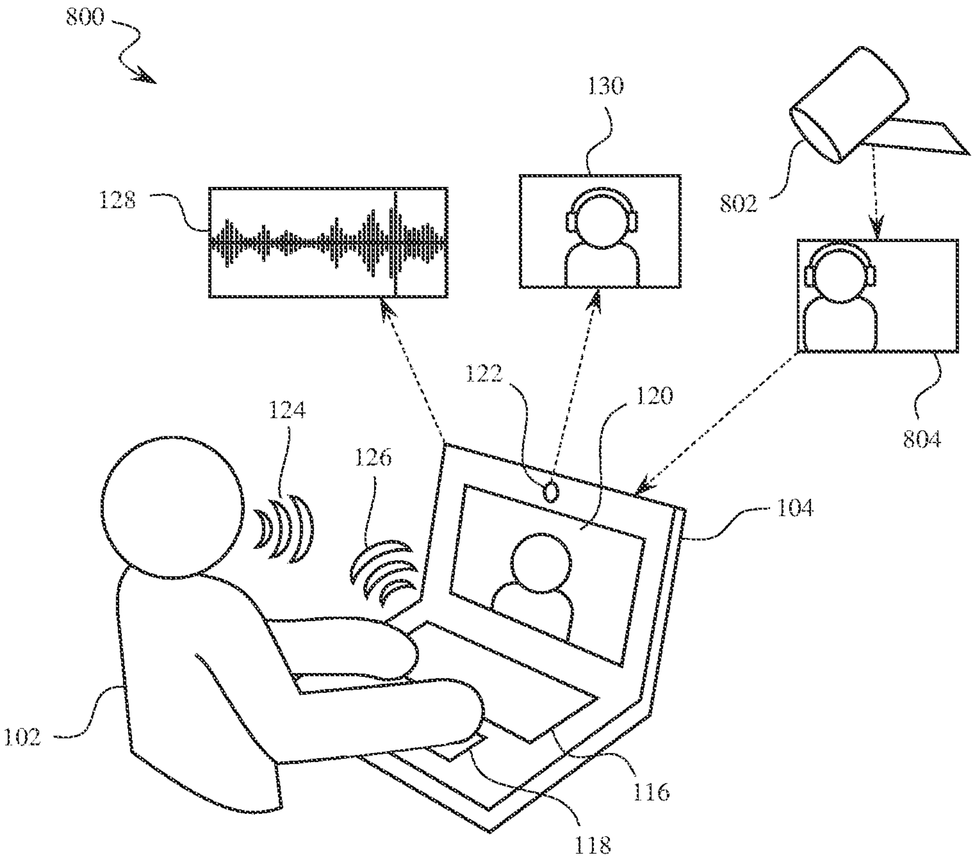
FIG. 8 shows a diagram illustrating another environment of the present disclosure.

FIG. 8 shows another environment 800 similar to environment 100 in which systems and devices of the present disclosure are shown. In this environment 800, reference numbers are repeated for elements already described in connection with environment 100. In addition to those elements, the environment 800 can include an external device 802 having an image sensor (e.g., a security camera, webcam, smart phone (e.g., 1110 in FIG. 11), second computing device, tablet computer, similar devices, and combinations thereof) configured to collect image data from the environment 800 separate from the computing device 104, such as image 804. The external device 802 can therefore be positioned and oriented to obtain a different field of view or different image information as compared to the camera 122 of the computing device 104. Furthermore, in some examples the computing device 104 lacks a camera 122, and the external device 802 is the only image-capturing device in the environment 800. The external device 802 can be in electronic communication with the computing device 104 to provide its image information 804 to the computing device. In some examples, the external device can be in electronic communication with the network to which the computing device 104 is in electronic communication so that the image 804 can be relayed to the computing device 104 via the network. For example, the devices can communicate via network interfaces 1812 and a network 1805, as described in connection with FIG. 18 below.

Figure 9:
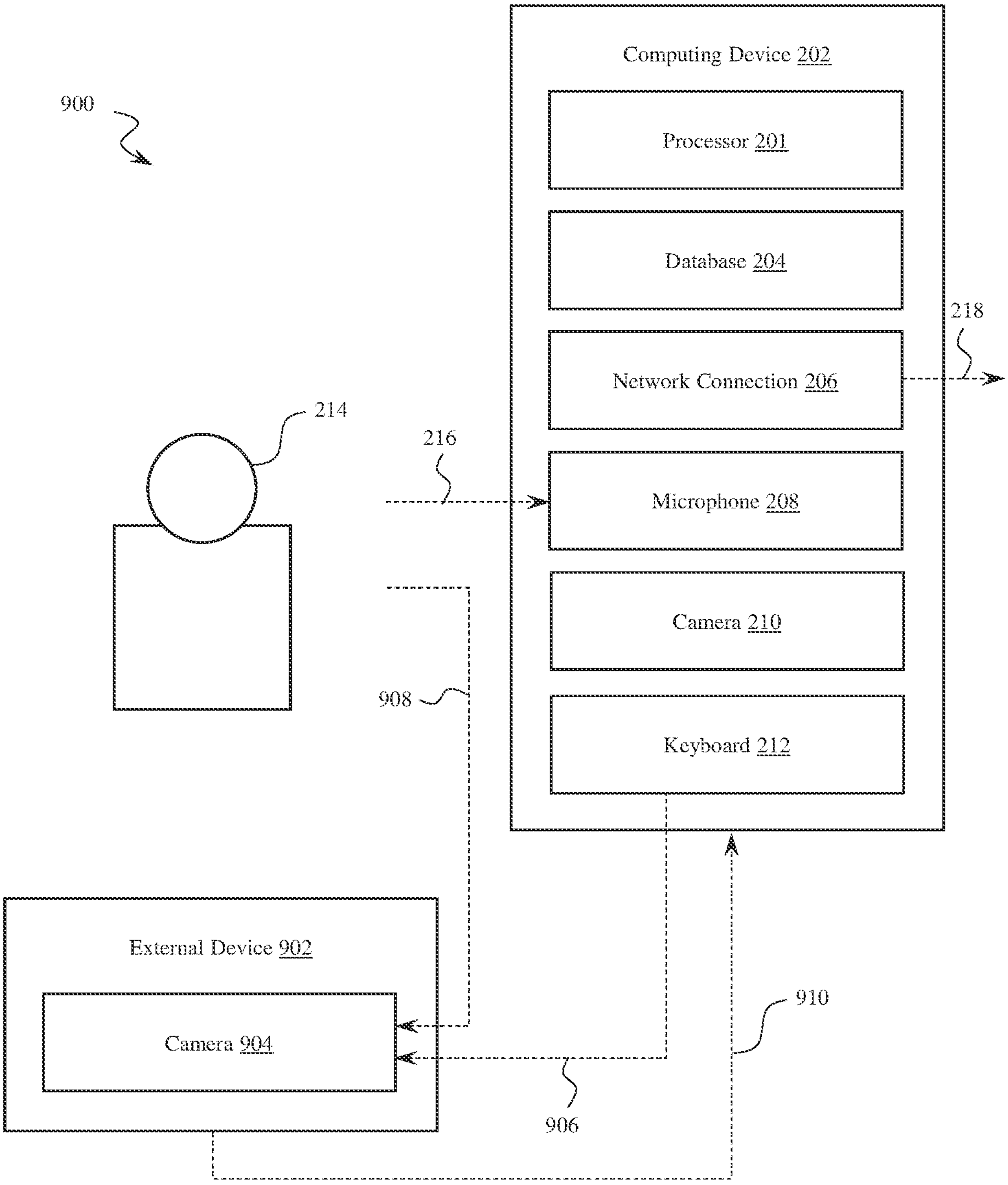
FIG. 9 shows a schematic view of another computing system of the present disclosure.

FIG. 9 shows a system 900 corresponding to environment 800 and similar to system 200. In this system 900, reference numbers are repeated for elements already described in connection with system 200. An external device 902 (e.g., external device 802) has a camera 904 or other image-capturing device. The camera 904 can be configured to receive image information from the environment (e.g., 800), such as by having the keyboard 212 or the user 214 within the field of view of the camera 904, as indicated by arrows 906 and 908, respectively. As discussed in connection with FIG. 2, microphone 208 can receive audio signals, as suggested by arrow 216. The external device 902 can output a signal, as indicated by arrow 910, that is transferred to the computing device 202. In some examples, the signal from the external device 902 is transferred to the computing device 202 via the network connection 206. Thus, the devices 202 and 902 can be in electrical communication with each other.

Figure 10:
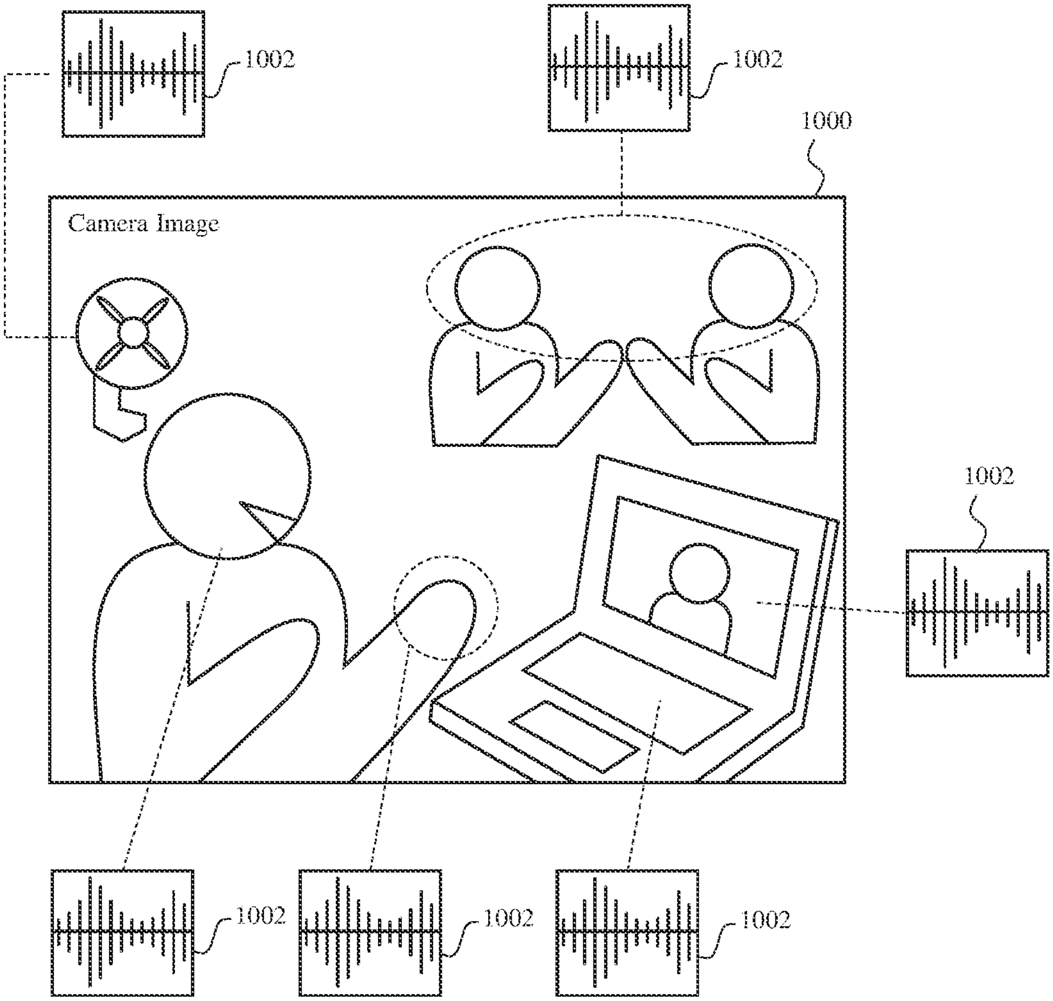
FIG. 10 shows a diagram representing another camera image of an embodiment of the present disclosure.

FIG. 10 shows an example image 1000 collected from a camera of an external device, such as, for example, camera 904 of external device 902. Similar to image 300, the image 1000 can include shapes, lines, and other image information representing people and objects within the field of view of the camera. Additionally, the image 1000 and can view the user and her computing device from a different angle than from the perspective of a camera on the computing device itself (e.g., 122), which can potentially allow the image 1000 to detect image information of parts of the computing device that would otherwise not be viewable by a camera on the computing device. For example, cameras on computing devices are often positioned adjacent to, and in plane with, a display screen, thereby making the display screen impossible to view with the camera. Using an external device, the image 1000 can include image information showing the display screen, applications being operated on the display screen, another camera on the computing device, a backside of the camera or display housing, etc. Accordingly, image information in the image 1000 of the external device can be used in place of, or in addition to, image information obtained by a camera of the computing device. This image information can allow the computing device to identify other sources of noises external to the computing device, and identify sound information associated with those sources such as the examples of sound information 1002 shown in FIG. 10. This image information can be used in connection with method 400 to modify audio signals using the sound information detected based on sources of noise in the image 1000, as described in connection with FIG. 4.

Additionally, using image information from an external device can facilitate determining distances between the user and the computing device or between the user and other noise-making objects in the environment of the user. Thus, in some embodiments, performance of block 408 can include modifying the audio signal based on how far apart the user or other noisemaking objects are from the microphone or from each other. For example, the audio signal can be less attenuated for certain frequencies if it can be determined that a source of an noise that makes those frequencies is far away from the microphone obtaining the audio signal, thereby limiting the amount of attenuation that would unnecessarily interfere with the other sounds recorded in the audio signal. For noise sources that are closer to the microphone, sounds can be reduced, muted, or canceled more aggressively to help ensure that a user's voice content in the audio signal is preserved.

Figure 11:
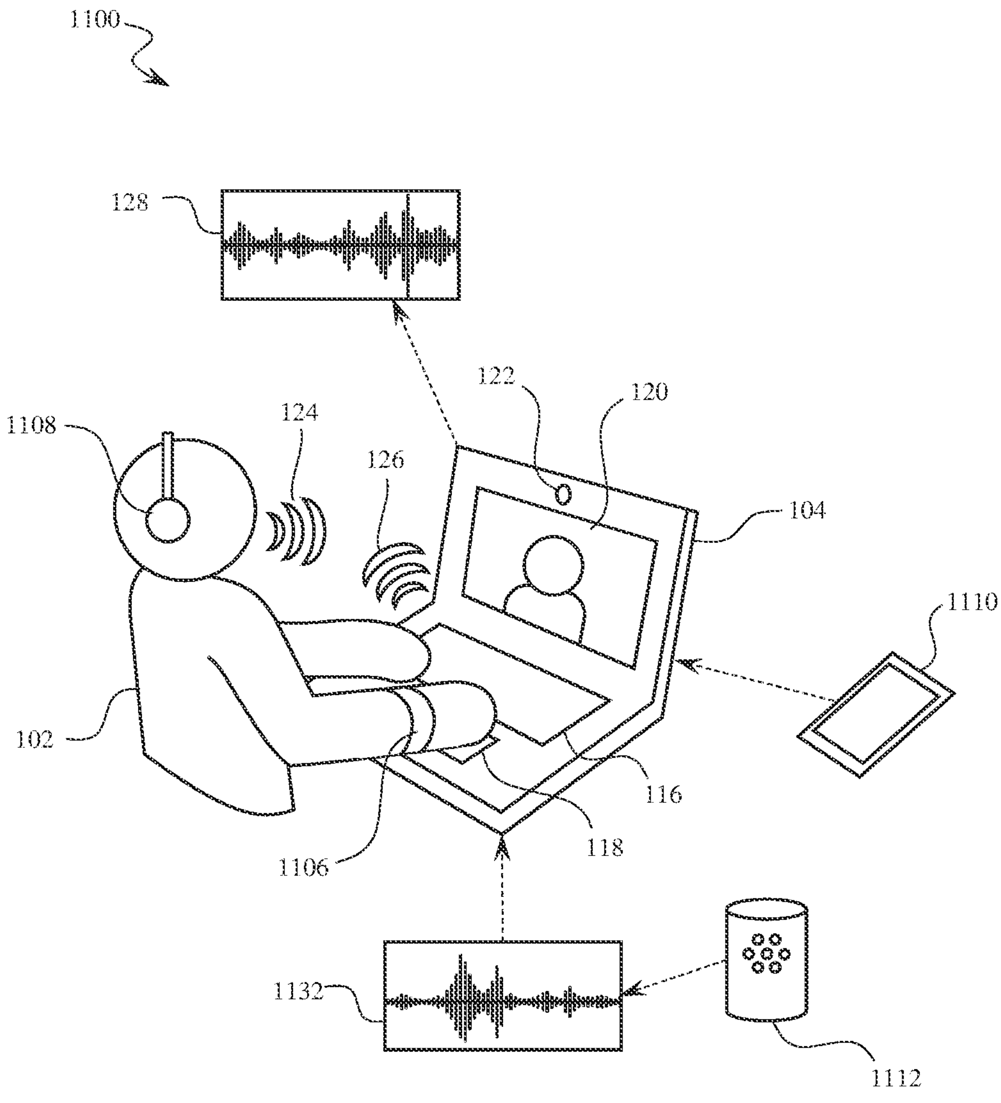
FIG. 11 shows a diagram illustrating another environment of the present disclosure.

FIG. 11 shows yet another environment 1100 similar to environments 100 and 800 in which systems and devices of the present disclosure are shown. In this environment 1100, reference numbers are repeated for elements already described in connection with environment 100. In addition to those elements, the environment 1100 can include external devices such as, for example, a set of wearable devices being worn by the user 102, including, in this example, a smart wristwatch 1106 or headphones 1108. Other devices in the environment 1100 can include an external or secondary computing device such as a smart phone or tablet computing device 1110, a "smart speaker" 1112, another computing device, another recording device, related devices, and combinations thereof.

The other devices, such as wristwatch 1106, headphones 1108, tablet device 1110, and smart speaker 1112, can have their own microphones that are separate from the microphone(s) of the computing device 104. Thus, as shown with smart speaker 1112, for example, the sounds 124, 126 can be recorded by the smart speaker 1112 and converted into a waveform 1132. In some embodiments, the waveform 1132 can be sent to the computing device 104. Similarly, audio data similar to waveform 1132 can be collected by other devices (e.g., 1106, 1108, 1110) in the environment 1100.

The other devices can have image-capturing capability in the environment 1100, such as a tablet device 1110, headset, or visor worn by the user 102. Those devices can capture an image (or series of images/video) that can be used similar to the image 804, as described above. Furthermore, an imaging device such as camera 802 can be used in conjunction with the other devices shown in FIG. 11.

Figure 12:
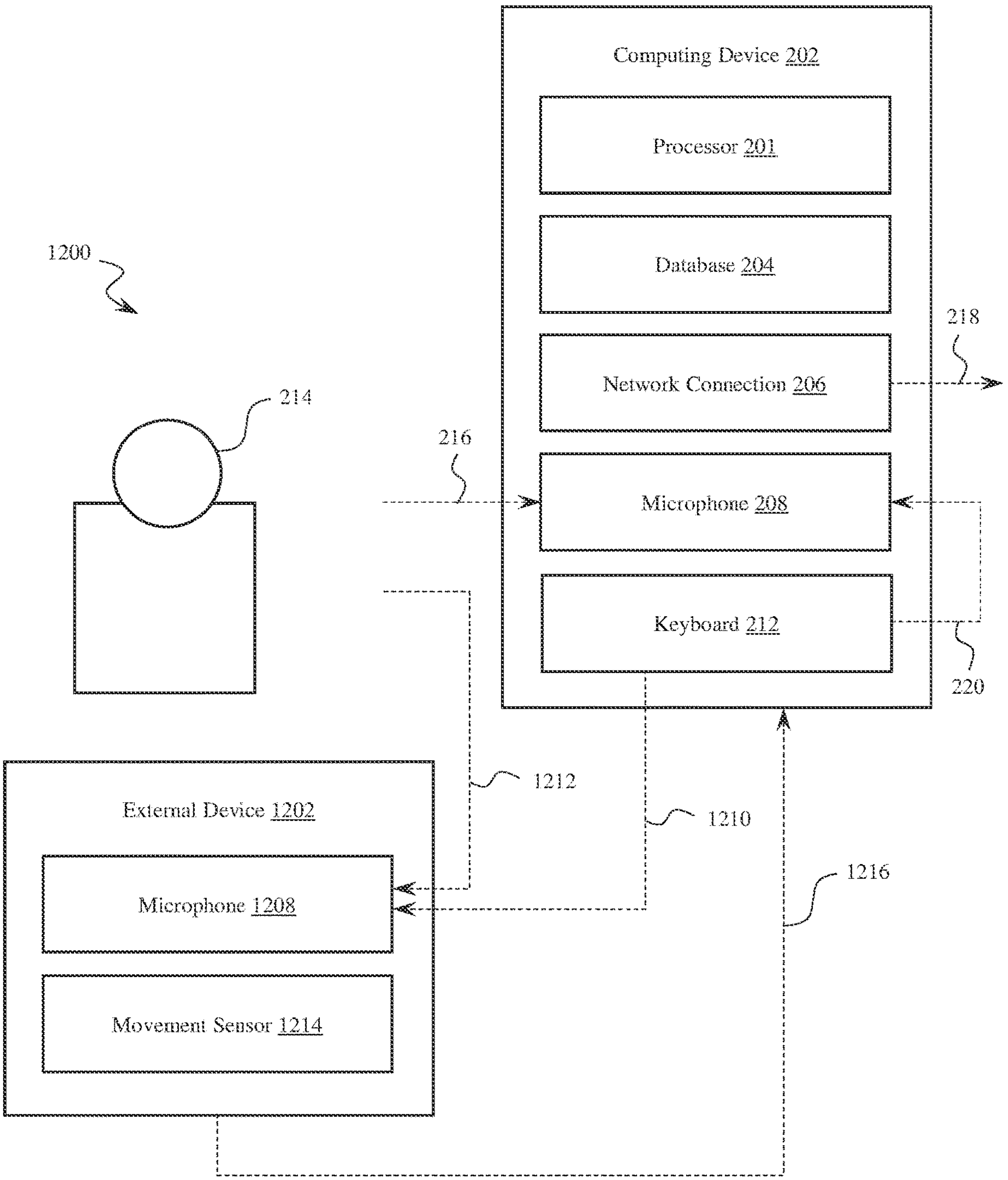
FIG. 12 shows a schematic view of another computing system of the present disclosure.

FIG. 12 shows a system 1200 corresponding to environment 1100 and similar to systems 200 and 900. In this embodiment, reference numbers are repeated for elements already described in connection with systems 200 and 900. In some embodiments, elements from systems 200 and 900 can be incorporated into system 1200. For example, the computing device 202 can include a camera (e.g., 210) configured to perform functions described above in connection with FIG. 2, and the external device 1202 can include a camera (e.g., 904) configured to perform functions described above in connection with FIG. 9. The external device 1202 can output a signal, as indicated by arrow 1216, that is transferred to the computing device 202. In some examples, the signal from the external device 1202 is transferred to the computing device 202 via the network connection 206. Also, in some examples, the computing device 202 can be used to control the external device 1202 (or external device 902).

An external device 1202 (e.g., one of external devices 1110, 1112 or wearable devices 1106, 1108) can include a microphone 1208 that is separate from the microphone 208 of the computing device 202. Thus, the microphone 208 can be referred to as a first microphone, and microphone 1208 can be referred to as a second microphone, an external microphone, or an environmental microphone.

Figure 13:
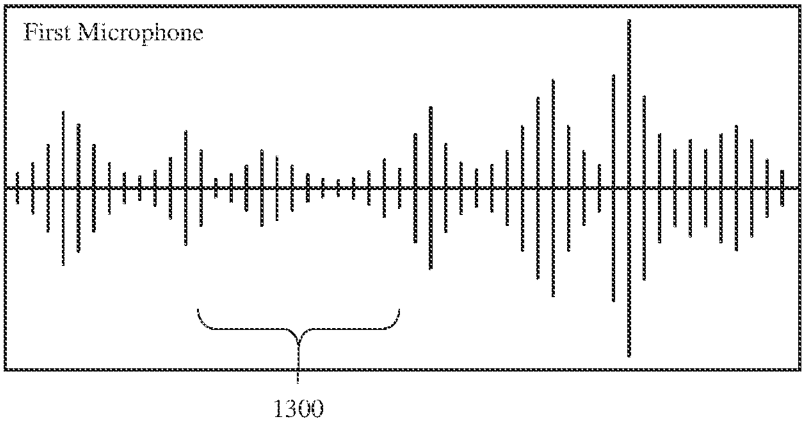
FIG. 13 shows a diagram representing an audio signal obtained by a microphone of the present disclosure.
Figure 14:
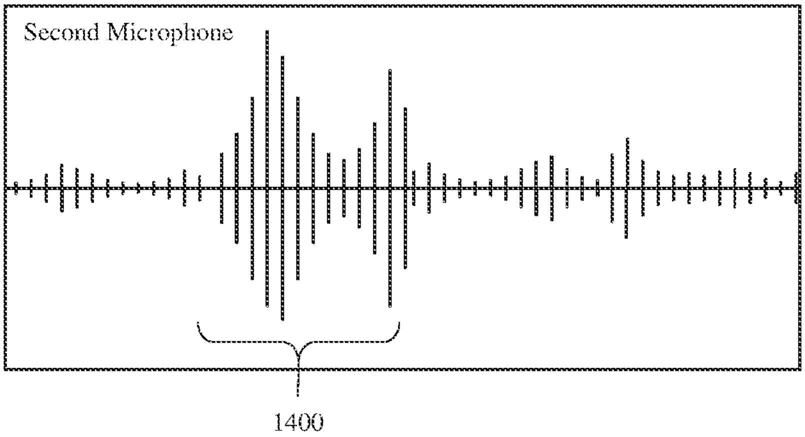
FIG. 14 shows a diagram representing a second audio signal obtained by a second microphone of an embodiment of the present disclosure.
Figure 15:
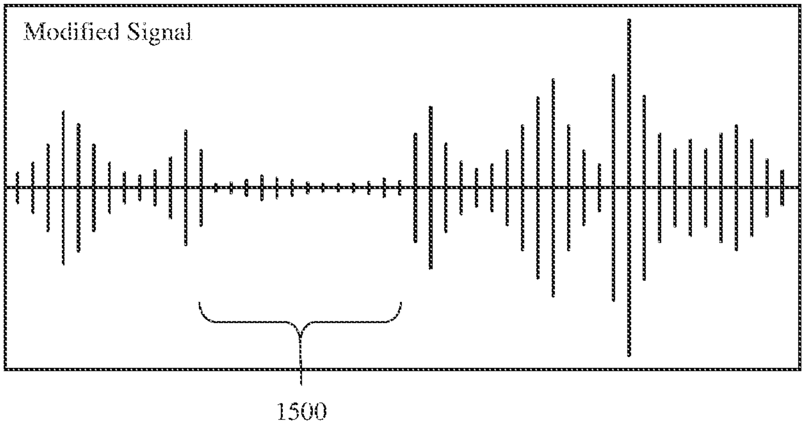
FIG. 15 shows a diagram representing a modified audio signal of the present disclosure.

The second microphone 1208 can be used to record audio and to create and produce an additional or secondary audio signal that is different from the main or primary audio signal generated by the microphone 208. Thus, as schematically shown in FIG. 13, the primary or first microphone (e.g., 208) can produce a first audio signal. FIG. 12 shows an example illustration of this action, as indicated by arrows 216 and 220, wherein sounds from the keyboard 212 and user 214 are recorded by the first microphone 208. Simultaneously, the additional or second microphone 1208 of the external device 1202 can be positioned within the environment of the keyboard 212 and user 214 and can produce a second audio signal, as schematically shown in FIG. 14 and as indicated by arrows 1210 and 1212 in FIG. 12. The first audio signal of FIG. 13 and the second audio signal of FIG. 14 can be used to produce a modified audio signal, as shown in FIG. 15, as described below.

Figure 16:
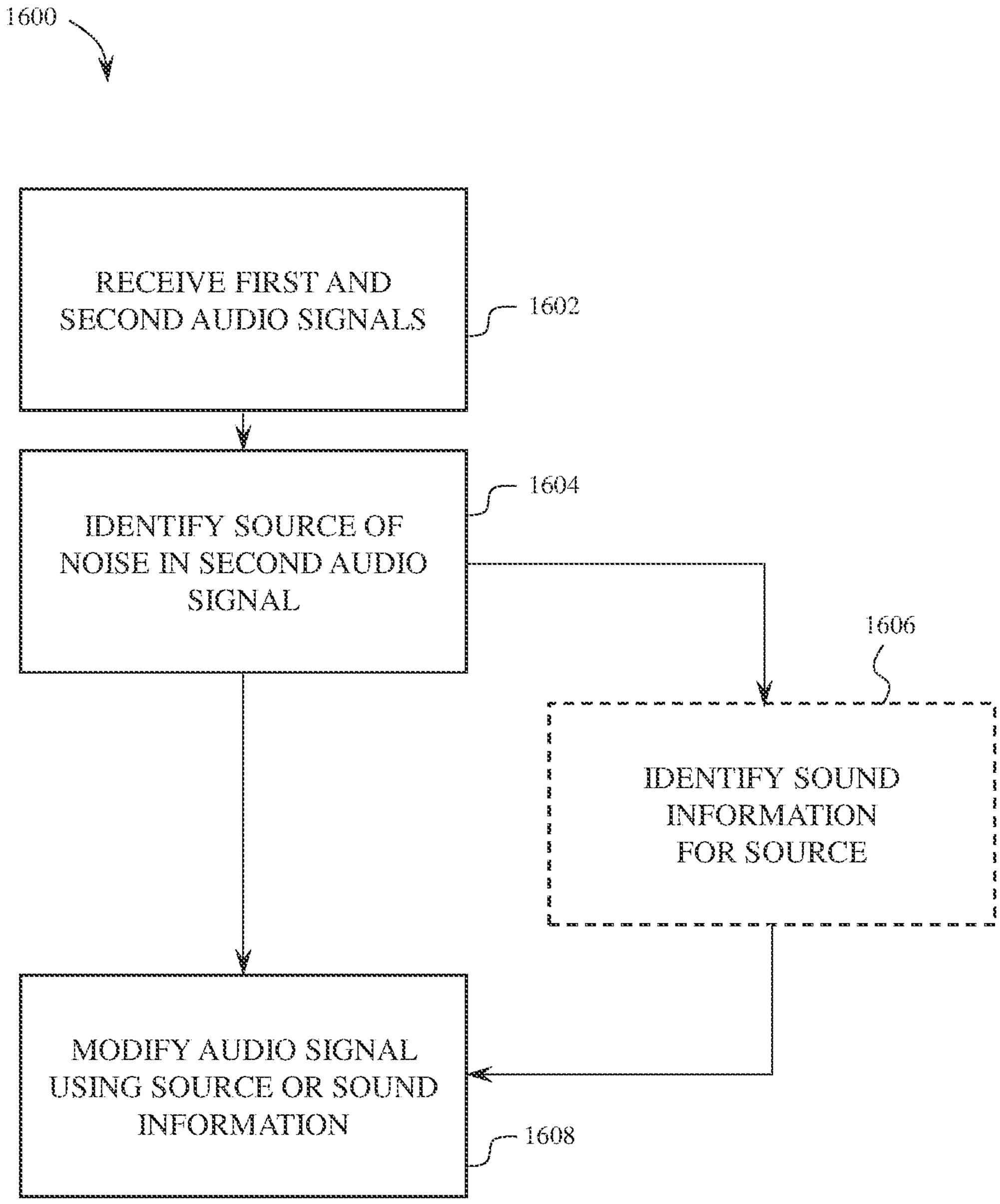
FIG. 16 shows a flow diagram of another method of the present disclosure.

FIG. 16 is a flow diagram showing a method 1600 of processing and analyzing multiple audio signals in order to reduce unwanted noise in an audio recording. In this method 1600, a computing device can receive at least two audio signals, as indicated in block 1602. For example, the computing device can receive a first audio signal (e.g., as shown in FIG. 13 and via arrow 220) from a first microphone (e.g., 208) and can receive a second audio signal from a second microphone (e.g., 1208). The first microphone can be part of the computing device operating the method 1600, and the second microphone can be part of an external device (e.g., 1202) configured to electronically communicate with the computing device operating the method 1600.

As indicated in block 1604, the computing device can identify a source of a noise using the second audio signal. For instance, as shown in FIG. 14, a waveform can include recorded representations of sounds made by people and things (e.g., a keyboard 212) in the sensing range of the second microphone. Thus, while performing block 1604, the computing device can analyze the information in the second audio signal and correlate the audio information in the second audio signal with people and things that are sources of noises. For example, the computing device can use sound recognition techniques known in the art (e.g., music recognition, speech recognition, acoustic fingerprinting, spectrogram data processing, feature extraction, classification algorithms, etc.) to identify what sources of noise generate certain forms, frequencies, rhythms, and other audio information represented in the second audio signal. In some examples, a voice recognition algorithm can be used to identify a user 214 from the vocal sounds of a person's speech recorded by the second microphone, and an acoustic fingerprint recognition algorithm can be used to identify a typing sound on a keyboard in the second audio signal.

In some embodiments, an audio signal can be provided to the computing device for the computing device to record/ "learn" and compare to sound patterns in the first and second audio signals. Additionally, in some embodiments, performance of block 1604 can include analyzing the second audio signal to recognize non-vocal sounds made by a particular user or produced around the user, such as by detecting a particular user's typing cadence, a coughing sound, common sounds in their environment (e.g., a sound of their dog barking), etc. Accordingly, performing block 1604 can include tracking the occurrence of sounds in the first or second audio signals over time to help identify sources of noise as they occur for specific users over time.

The computing device can analyze the waveforms recorded by the first and second microphones and detect a representation of a target noise (e.g., sound pattern 1400). The target noise can occur in both audio signals of the first and second microphones, wherein the sound pattern 1400 occurs during a span of time that overlaps the overall span of time recorded by the first microphone (i.e., where sound pattern 1300 occurs in FIG. 13). The representation of the target noise obtained by the second microphone can beneficially be louder or more prominent when recorded by the second microphone (i.e., in pattern 1400) as compared to the target noise recorded by the first microphone (i.e., in pattern 1300) or relative to other sounds recorded by the second microphone (i.e., the rest of the audio signal outside pattern 1400 in FIG. 14). In this case, the computing device can have a clearer signal with which to identify the representation of the target noise in the overall audio recordings of the first and second microphones. The clearer signal can allow the computing device to more accurately identify the source of the target noise. Accordingly, in some embodiments, the method 1600 can include positioning the second microphone in the environment of the user in a position more likely to record an unwanted noise in the environment relative to the first microphone, such as by positioning the second microphone closer to a keyboard where typing is expected to take place or closer to a window where nearby traffic is anticipated to make distracting sounds. The first microphone can, in that case, be positioned relatively closer to a primary audio source such as by being closer to the intended speaker in a teleconference to accentuate wanted sounds relative to unwanted sounds in the first microphone's audio signal.

The method 1600 can further include identifying sound information (e.g., a waveform, frequency, rhythm, or sound pattern) correlated with the source of the noise identified, as indicated in block 1606, which is shown in broken lines to indicate that it is an optional step to be performed in some embodiments. Identifying the sound information can include accessing a database (e.g., 204 or a network-connected database of information that is accessible using the network connection 206) that stores recorded sounds or other sound information that is representative of the noise source. Thus, identifying the sound information can include identifying one or more recorded sounds in the database that correspond to the noise source identified in connection with block 1604. For example, such recorded sound information is shown and discussed in connection with FIG. 6. The waveform or sound pattern identified in block 1606 can be a recording of the source of block 1604 or can be a set of sound properties (e.g., frequency, rhythm, harmonization, modulation, etc.) that generally define noises made by objects similar to the source of block 1604. Thus, the waveform or sound pattern does not necessarily have to be an exact representation or recording of the source of block 1604 and can be an approximation or similar representation thereof. Additionally, if multiple different sources of noises are detected in the same sound recording, the computing device can determine sound information for each of the sources.

The method 1600 can further include modifying the audio signal of block 1602 based on the source identified in block 1604 or the sound information identified in block 1606, as indicated in block 1608. For instance, the computing device can correlate sounds made by the source of noise identified in block 1604 based on their appearance in the recording made by the second microphone (after identifying pattern 1400) and then reducing or attenuating those sounds in the recording made by the first microphone (i.e., within the time period of pattern 1300), as indicated by modified sound pattern 1500 in FIG. 15.

Furthermore, in some embodiments, the audio signal can include sound information (e.g., a pattern or frequency) that has characteristics similar to, or a copy of, the sound information determined in block 1606 within a recorded time span in the first or second audio signal, and the computing device can modify the first audio signal within that recorded time span to change the representation of the target noise, as indicated in pattern 1500.

In any embodiment, modifying the audio signal can include reducing the volume or amplitude of a waveform or set of frequencies in the audio signal to make the target noise (or other noises similar thereto) less prevalent or noticeable to a listener of the audio signal at a destination computer or at the computing device when the audio signal is played back. For example, as shown in FIG. 13, the audio signal (e.g., waveform 128 in FIG. 11) can include various frequencies and amplitudes recorded over time. FIG. 14 shows a representation of a waveform or sound pattern recorded by the second microphone (e.g., waveform 1132). Thus, in block 1608, the computing device can analyze the audio signal of FIG. 13 to detect the presence of a waveform similar to or matching a representation of a target noise (i.e., 1400) that appears in the waveform of FIG. 14. Accordingly, the computing device can modify the audio signal 1300 within the time span correlating to pattern 1400 to attenuate certain frequencies (or all frequencies) to minimize or eliminate the appearance of the target noise in the modified audio signal, as shown by pattern 1500 in FIG. 15. In other embodiments, the first and second microphones can be used for beamforming to isolate and enhance or increase the volume of wanted sounds relative to unwanted sounds. For example, vocalizations common to both of the audio signals of the microphones can be isolated by canceling or muting sounds that are not determined to be part of the vocalizations. The system can thereby focus on transmitting the vocalizations that are typically the most important part of the audio signal for a teleconference while allowing the other unwanted sounds to fade and recede in the teleconference. Furthermore, as a result of any of these operations, the computing device can produce a modified audio signal that is less distracting and contains fewer or quieter unwanted noises, thereby leading to an improved user experience for the presenter in a teleconference or videoconference and for the viewers or listeners as well.

Referring again to FIG. 16, in a related embodiment, the computing device can modify the audio signal in block 1608 by applying a filter to the entire audio signal based on the sound information of block 1606. Thus, rather than identifying a particular waveform in a particular span of time of the recorded audio signal, the sound information of block 1606 can include some properties to generally modify throughout the audio signal. For example, if the second audio signal contains recorded noises correlated with a noise-making object such as a fan, the frequencies associated with a fan can be attenuated and removed from the entire audio signal, as opposed to only removing those frequencies when the fan is plainly audible to the second microphone or as opposed to only removing those frequencies when a particular fan-representative waveform is identified in the first or second audio signal. Comparably, if a sound of a keyboard is identified in the second audio signal, any typing sound patterns or correlated frequencies in the first audio signal can be detected and removed for the modified audio signal, whether or not the keyboard is audible to the second microphone at all times that it is audible to the first microphone.

Referring again to FIG. 12, the external device 1202 can in some embodiments include a movement sensor 1214 in addition to, or instead of, a second microphone 1208. The movement sensor 1214 can include a position or movement sensing device configured to transduce a position or movement the external device 1202, such as an accelerometer, a gyroscope, an inertial measurement unit (IMU), a compass, an orientation sensor, similar devices, and combinations thereof. As the external device 1202 moves, the movement sensor 1214 can output a signal relayed to the computing device 202, either directly or via the network connection 206, as indicated by arrow 1216.

Figure 17:
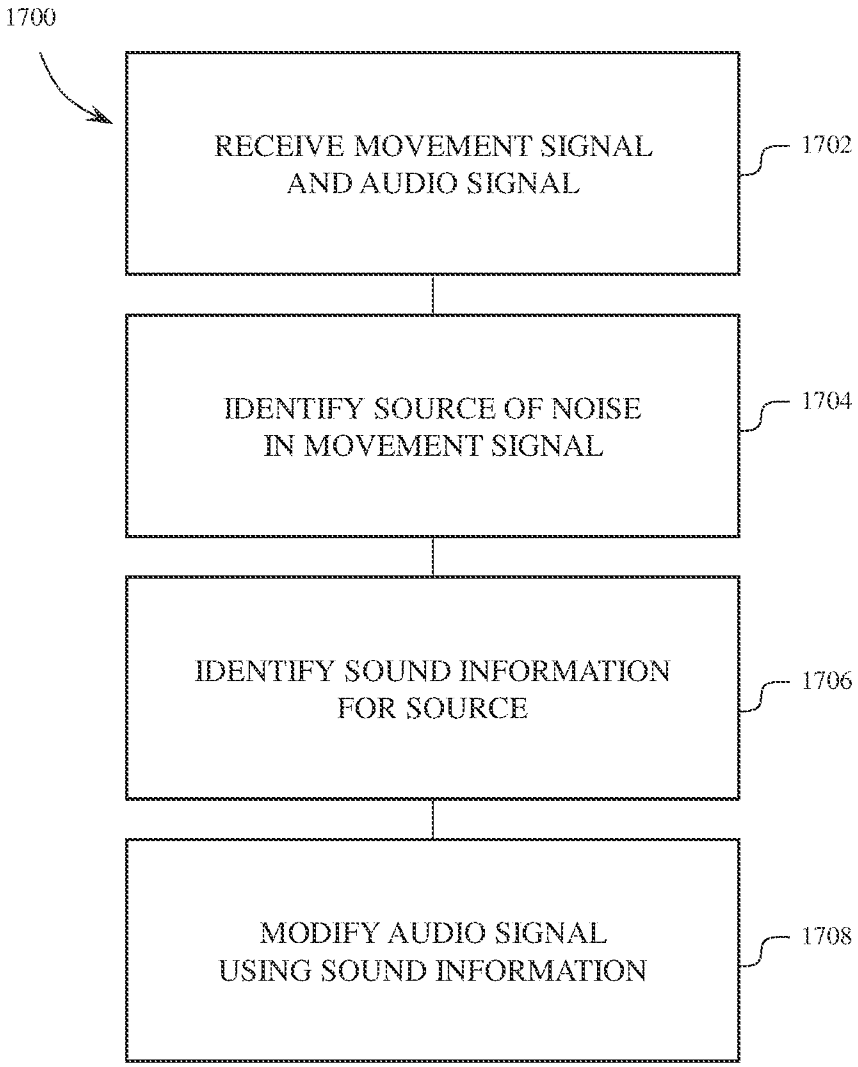
FIG. 17 shows a flow diagram of another method of the present disclosure.

The signal of the movement sensor 1214 can be used in a manner similar to the sound information described in methods 4 and 16. For example, as shown in FIG. 17, a method 1700 of the present disclosure can include receiving a movement signal and an audio signal, as indicated by block 1702. The movement signal can be a signal provided by the movement sensor 1214, and the audio signal can be provided by the microphone of the computing device 202. The timing of the movement signal can be correlated to the timing of the audio signal so that detected movements from the movement sensor 1214 can be compared to audio signals of the microphone 208.

In block 1704, the method 1700 can include identifying a source of a noise in the movement signal. In this case, rather than detecting a source of the noise using an image recognition or sound recognition technique, the computing device can employ a movement pattern recognition technique similar to techniques employed to detect steps, running, swimming, and other activities where sensors are in motion on a user. Therefore, this method 1700 can beneficially be implemented in embodiments where the movement sensor 1214 is positioned on a wearable device (e.g., 1106, 1108) that is worn by a user interacting with the computing device 202. Thus, performance of block 1704 can include identifying movement patterns of a motion sensor on a user's arm, such as in a wristwatch, to determine the position of the user's arm relative to the computing device 202 and to thereby determine whether the user has their hand next to the keyboard of the computing device, whether the user is actively typing on the keyboard and thereby moving their arm in a typing manner, or making another action with their arm that indicates that they are making a noise with their arm or a portion thereof. Similarly, the performance of block 1704 can include identifying movement patterns of the motion sensor on a user's head, such as in a headset, headphones, visor, helmet, or other head-mounted device to determine whether the user is facing the computing device 202, whether the user's mouth or jaw is moving, whether vibrations in the user's skull or jaw indicate that he or she is speaking, or other detected movements or changes in position of the user that suggests that the user is either making sound or is oriented or moving in a manner configured to avoid providing a sound to the microphone 208. Thus, identifying the source of noise in the movement signal in block 1704 can include identifying whether a representation of the source of noise should be reduced/canceled in a modified audio signal (see block 1708) or whether the representation of the source of noise should be isolated or highlighted in the modified audio signal.

In some embodiments, the computing device can play movement pattern recognition technique to detect a pattern output by a movement sensor that is part of the computing device 202 to determine that the computing device 202 is moving, such as when a user 102 is typing on the keyboard 116, using a trackpad 118, lifting the computing device 202, adjusting a display 120, or making other sounds with the computing device itself.

The method 1700 can further include identifying sound information for the source of noise identified in block 1704, as indicated in block 1706. In other words, the computing device can identify sound characteristics that are typical in recordings of sounds made by the source of noise identified in block 1704. This can be done using the methods described above in connection with blocks 406 and 1606. For example, if the computing device determines, via the motion sensor signals, that the source of noise is a user's hand typing on the keyboard 212, typing sound information can be identified for that keyboard 212 or for that user's typing style so that the computing device can modify the audio signal of the microphone 208 to eliminate typing sounds in the audio signal in block 1708.

Thus, the method 1700 can include modifying the audio signal using the sound information, as shown in block 1708, by using the methods described above in connection with blocks 408 and 1608. For example, the computing device can reduce or attenuate sounds in the audio signal of the microphone 208 that corresponds to typing sounds having the characteristics of sound information determined in block 1706 after detecting a characteristic movement pattern in block 1704, even if the microphone 208 does not detect a clear, isolated typing sound in the recording made by the microphone 208. Thus, by leveraging the use of multiple devices, such as computing device 202 and external device 1202, the modified audio signal can have reduced or eliminated unwanted noises in situations where a single microphone, or even multiple microphones on a single computing device, would not be as effective.

Figure 18:
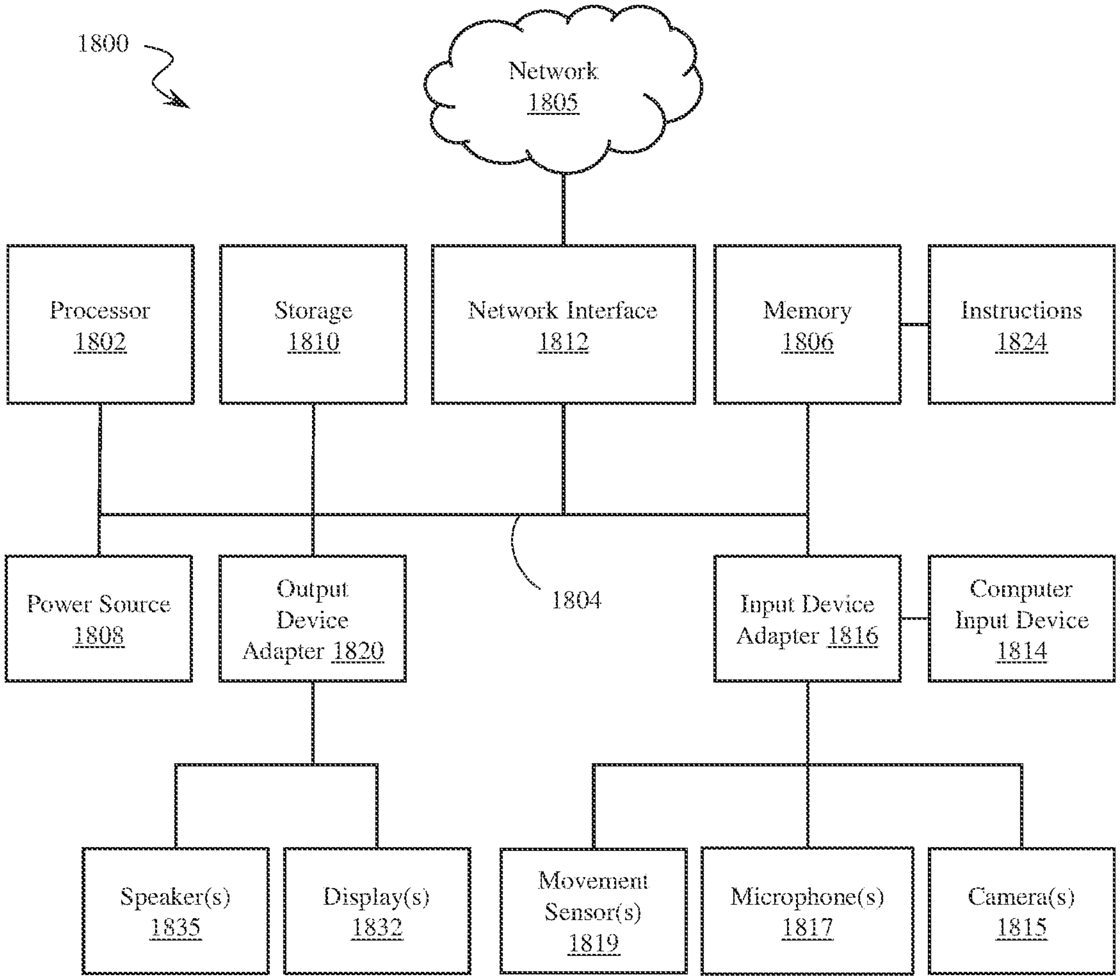
FIG. 18 shows a block diagram of a computing system of various embodiments of the present disclosure.

FIG. 18 is a block diagram showing elements of a computing system 1800 that can be used in embodiments of the computing devices discloses herein (e.g., computing devices 104, 202 and external devices 902, 1202). Alternatively, the computing system 1800 can be a separate system embodied in a remote device connectable to the computing devices disclosed herein. The computing system 1800 can be embodied as a personal computer, a server, a portable computing device, a set of computing devices, similar devices, and combinations thereof.

Accordingly, FIG. 18 is a block diagram of a computer system 1800 or computing device according to an embodiment of the present disclosure. In various examples, the computer system 1800 can include various sets and subsets of the components shown in FIG. 18. Thus, FIG. 18 shows a variety of components that can be included in various combinations and subsets based on the operations and functions performed by the system 1800 in different embodiments. It is noted that, when described or recited herein, the use of the articles such as "a" or "an" is not considered to be limiting to only one, but instead is intended to mean one or more unless otherwise specifically noted herein.

The computer system 1800 can include a central processing unit (CPU) or processor 1802 connected via a bus 1804 for electrical communication to a memory device 1806, a power source 1808, an electronic storage device 1810, a network interface 1812, an input device adapter 1816, and an output device adapter 1820. For example, one or more of these components can be connected to each other via a substrate (e.g., a printed circuit board or other substrate) supporting the bus 1804 and other electrical connectors providing electrical communication between the components. The bus 1804 can include a communication mechanism for communicating information between parts of the system 1800.

The processor 1802 can be a microprocessor, central processing unit, or a similar device configured to receive and execute a set of instructions 1824 stored by the memory 1806. The memory 1806 can be referred to as main memory, such as random access memory (RAM) or another dynamic electronic storage device for storing information and instructions to be executed by the processor 1802. The memory 1806 can also be used for storing temporary variables or other intermediate information during execution of instructions executed by the processor 1802. The storage device 1810 can include read-only memory (ROM) or another type of static storage device coupled to the bus 1804 for storing static or long-term (i.e., non-dynamic) information and instructions for the processor 1802. For example, the storage device 1810 can include a magnetic or optical disk (e.g., hard disk drive (HDD)), a solid state memory (e.g., a solid state disk (SSD)), or a comparable device. The power source 1808 can include a power supply capable of providing power to the processor 1802 and other components connected to the bus 1804, such as a connection to an electrical utility grid or a battery system of an autonomous device (e.g., 100).

The instructions 1824 can include information for executing processes and methods using components of the system 1800 and other components connected to the system 1800. Such processes and methods can include, for example, the methods described elsewhere herein, such as, for example, methods described in connection with FIGS. 1-17.

The network interface 1812 can include an adapter for connecting the system 1800 to an external device via a wired or wireless connection. For example, the network interface 1812 can provide a connection to a computer network 1805 such as a cellular network, the Internet, a local area network (LAN), network connection 206, a separate device capable of wireless communication with the network interface 1812 (e.g., computing device 202 or external devices 902 and 1202), other external devices or network locations, and combinations thereof. In one example embodiment, the network interface 1812 is a wireless networking adapter configured to connect via WI-FI, BLUETOOTH®, BLUETOOTH LOW ENERGY (BLE), long-term evolution (LTE), 5G, a mesh network, or a related wireless communications protocol to another device having interface capability using the same protocol. In some embodiments, a network device or set of network devices in the network 1805 can be considered part of the system 1800. In some examples, a network device can be considered connected to, but not a part of, the system 1800.

The input device adapter 1816 can be configured to provide the system 1800 with connectivity to various input devices such as, for example, a computer input device 1814 (e.g., keyboard 116 or 212 or mouse 118), cameras 1815 (e.g., 122, 210, 802, or 904), microphones 1817 (e.g., 208 or 1208), movement sensors 1819 (e.g., 1214), one or more other sensors, related devices, and combinations thereof.

The output device adapter 1820 can be configured to provide the system 1800 with the ability to output information to a user, such as by providing visual output using one or more displays 1832 and by providing audible output using one or more speakers 1835. The processor 1802 can be configured to control the output device adapter 1820 to provide information to a user via the output devices connected to the adapter 1820.

The instructions 1824 can include electronic instructions that, when executed by the processor 1802, can perform methods and processes as described in further detail elsewhere herein. The instructions 1824 can be stored or encoded on a non-transitory computer readable medium, and the instructions 1824, when executed by a computing device such as, for example, processor 1802, cause the computing device to perform methods and processes as described in further detail elsewhere herein. See, e.g., FIGS. 4, 16, and 17.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A system for reducing unwanted noise in an electronic audio signal, the system comprising:
- a computing device comprising a first microphone;
- a memory;
- a processor; and
- a head-mountable device in electronic communication with the computing device, the head-mountable device positioned external to and separate from the computing device, and comprising a second microphone;
- wherein the processor is configured to:
  - detect a target noise within a first audio signal from the second microphone of the head-mountable device;
  - detect the target noise within a second audio signal from the first microphone of the computing device; and
  - modify at least one of the first audio signal or the second audio signal to reduce a representation of the target noise.

2. The system of claim 1, wherein the head-mountable device comprises a sensor including an imaging device, and wherein detecting the target noise includes detecting an object in an image sensed by the imaging device.

3. The system of claim 1, wherein the head-mountable device comprises a sensor configured to detect a position or a movement of the head-mountable device, and wherein detecting production of the target noise includes detecting a change in position of the head-mountable device or a movement of the head-mountable device via the sensor.

4. The system of claim 1, wherein the head-mountable device comprises a movement sensor configured to detect movement indicative of a user speaking.

5. The system of claim 1, wherein:
- the computing device includes a keyboard;
- the target noise is a sound originating from the keyboard;
- the representation of the target noise is a recording of the target noise; and
- modifying the second audio signal includes at least partially canceling out the recording of the target noise in the second audio signal.

6. A method of managing sounds while teleconferencing, the method comprising:
- recording a first audio signal and detecting a target noise within the first audio signal via a first microphone disposed with a wearable electronic device;
- recording a second audio signal and detecting the target noise within the second audio signal via a second microphone disposed with a computing device;
- detecting a motion via a movement sensor of a head-mountable device; and
- reducing a representation of the target noise based on the detected motion.

7. The method of claim 6, further comprising determining whether a user is facing a source computer based on the detected motion.

8. The method of claim 6, further comprising identifying a movement pattern via the movement sensor, the movement pattern corresponding to movements of a user's mouth.

9. The method of claim 6, further comprising detecting an unwanted sound based at least in part on the detected motion.

10. The method of claim 9, further comprising identifying a physical act based on the detected motion, and wherein the unwanted sound includes a noise produced by a person performing the physical act.

11. The method of claim 6, further comprising detecting a position of a user relative to a source computer via the movement sensor, wherein a wanted sound is identified and amplified based on the position of the user relative to the source computer.

12. The method of claim 6, wherein detecting the motion via the movement sensor of the head-mountable device comprises detecting a motion of a user's jaw.

13. A computing system, comprising:

a head-mountable device including an imaging sensor;

a microphone; and a processor in electronic communication with the imaging sensor of the head-mountable device and with the microphone, the processor configured to:

receive an audio signal produced by the microphone;

obtain an image via the imaging sensor of the head-mountable device; and modify the audio signal based on the image.

14. The computing system of claim 13, wherein the processor is configured to determine an orientation of the head-mountable device relative to a computing device, based on the image.

15. The computing system of claim 13, wherein modifying the audio signal includes at least partially canceling a target noise in the audio signal.

16. The computing system of claim 13, wherein modifying the audio signal includes isolating a representation of a target noise in the audio signal.

17. The computing system of claim 13, wherein the processor is configured to identify sound information associated with the image.

18. The computing system of claim 13, a distance between a user and a computing device is determined based on the image.

19. The computing system of claim 13, wherein the processor is configured to associate the image with a detected sound.

20. The computing system of claim 19, wherein associating the image with the detected sound comprises detecting a noise-making action in the image.

* * * * *